US 6,564,869 B2

(12) United States Patent
McKenzie et al.

(10) Patent No.: US 6,564,869 B2
(45) Date of Patent: May 20, 2003

(54) METHOD AND COMPOSITION FOR CLEANING AND INHIBITING SOLID, BITUMIN TAR, AND VISCOUS FLUID ACCRETION IN AND ON WELL EQUIPMENT

(75) Inventors: Neil McKenzie, Calgary (CA); John Ewanek, Calgary (CA)

(73) Assignee: M-I, L.L.C., Houston, TX (US)

( * ) Notice: Subject to any disclaimer, the term of this patent is extended or adjusted under 35 U.S.C. 154(b) by 0 days.

(21) Appl. No.: 09/906,574

(22) Filed: Jul. 16, 2001

(65) Prior Publication Data

US 2003/0024703 A1 Feb. 6, 2003

(51) Int. Cl.⁷ .............................................. E21B 37/06
(52) U.S. Cl. ..................... 166/304; 166/305.1; 507/246
(58) Field of Search .................. 166/379, 303, 166/304, 305.1, 312, 371, 311; 507/246, 263, 265, 928, 929, 931

(56) References Cited

U.S. PATENT DOCUMENTS

| 5,484,488 | A | * | 1/1996 | Hart et al. | 134/22.13 |
|---|---|---|---|---|---|
| 5,547,925 | A | | 8/1996 | Duncan, Jr. | 507/103 |
| 5,587,354 | A | * | 12/1996 | Duncan, Jr. | 507/137 |
| 5,676,763 | A | * | 10/1997 | Salisbury et al. | 134/22.12 |
| 5,678,631 | A | * | 10/1997 | Salisbury et al. | 166/304 |
| 5,773,390 | A | | 6/1998 | Salisbury et al. | 507/246 |
| 6,051,535 | A | * | 4/2000 | Bilden et al. | 507/90 |
| 6,143,709 | A | * | 11/2000 | Carey | 510/269 |
| 6,173,776 | B1 | * | 1/2001 | Furman et al. | 166/279 |
| 6,289,989 | B1 | * | 9/2001 | Mueller et al. | 166/311 |

FOREIGN PATENT DOCUMENTS

| EP | 0 178 340 A1 | 4/1986 | C11D/7/24 |
|---|---|---|---|
| EP | 0 697 471 A1 | 2/1996 | C23G/5/024 |
| WO | WO 00/73620 A1 | 12/2000 | E21B/37/06 |

OTHER PUBLICATIONS

PCT Search Report dated Oct. 25, 2002, 7 pages.

* cited by examiner

Primary Examiner—Frank Tsay
(74) Attorney, Agent, or Firm—Rosenthal & Osha L.L.P.

(57) ABSTRACT

This disclosure relates to a method and composition for cleaning and inhibiting solid, bitumin tar, and viscous fluid deposition in well equipment used in conjunction with a water-based well fluid which includes mixing an effective amount of a miscible terpene in the well fluid. In one embodiment, a method for cleaning and inhibiting deposits in and on well equipment used in conjunction with a water-based well fluid which includes mixing an effective amount of d-limonene into the well fluid is disclosed.

11 Claims, No Drawings

METHOD AND COMPOSITION FOR CLEANING AND INHIBITING SOLID, BITUMIN TAR, AND VISCOUS FLUID ACCRETION IN AND ON WELL EQUIPMENT

BACKGROUND OF THE INVENTION

1. Field of the Invention

The present invention relates generally to cleaning and inhibiting deposited solids and viscous fluids (including bitumin and other hydrocarbons) in and on well equipment, such as flowlines, injection lines, shakers, and other equipment having metal surfaces. More particularly, the present invention relates to the use of terpene additives in water based well fluids to clean and inhibit solids, bitumin tar, and viscous fluids deposited in such well equipment.

2. Background Art

When drilling or completing wells in earth formations, various fluids typically are used in the well for a variety of reasons. For purposes of description of the background of the invention and of the invention itself, such fluids will be referred to as "well fluids." Common uses for well fluids include: lubrication and cooling of drill bit cutting surfaces while drilling generally or drilling-in (i.e., drilling in a targeted petroleum bearing formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, implacing a packer fluid, abandoning the well or preparing the well for abandonment, and otherwise treating the well or the formation.

Environmental regulations governing the use and disposal of these well fluids have become increasingly restrictive. With the increase in regulation, many well fluids, which had been "oil-based" (having hydrocarbon as a principal component) are now "water-based." Further, certain types of wells will suffer formation damage if an oil-based well fluid is used. While water-based well fluids are generally superior from an environmental perspective, and often from an economic perspective, the water-based well fluids have some disadvantages as well. Most notably, it has been found that the deposit of heavy hydrocarbonaceous materials and finely divided inorganic solids on the inner surfaces of the piping (and, in general, on all of the metal surfaces present) used in well drilling applications is more significant when using water-based well fluids than when using oil-based well fluids.

The deposits discussed above typically comprise finely divided inorganic particles, such as solids produced from the formation, which may include hydraulic fracturing proppant, formation sand, clay and various other precipitates. These particles become coated with hydrocarbonaceous materials and subsequently accumulate additional quantities of heavy hydrocarbonaceous material in flowlines, settling tanks, and other surfaces on and in well equipment, both metal and ceramic.

The deposits are slimy, oily substances which strongly adhere to metal and ceramic surfaces, as well as other surfaces of the well equipment, and serve to inhibit fluid flow throughout a drilling or production system. Other areas susceptible to deposit build-up, not explicitly referred to above, include shakers, screens, and the other filtration systems used in a drilling system. Common apparatus for mechanically removing solids from drilling mud include shale shakers and vibratory screens, desanders, desilters, and centrifuges. Again, as deposits form on these devices, fluid flow through the devices is curtailed, thereby causing operating problems.

Much of the prior art deals with mechanical attempts to clean drilling equipment. However, mechanical cleaning is not practicable with respect to all of the drilling equipment. Another method of cleaning has been to include potassium sulfate as an additive to the well fluid.

What is needed, therefore, is a simple, low-cost system for cleaning and inhibiting the accretion of tar an other fluids or solids in and on drilling equipment in water-based well fluid applications.

SUMMARY OF THE INVENTION

In one aspect, the present invention relates to a method for cleaning and inhibiting deposits in and on well equipment used in conjunction with a water-based well fluid which comprises mixing an effective amount of a miscible terpene in the well fluid.

In another aspect, the present invention relates to a method for cleaning and inhibiting deposits in and on well equipment used in conjunction with a water-based well fluid which comprises mixing an effective amount of d-limonene into the well fluid.

In another aspect, the present invention relates to a water-based well fluid which comprises an effective amount of miscible terpene in the well fluid.

In another aspect, the present invention relates to a water based well fluid which comprises an effective amount of d-limonene into the well fluid.

Other aspects and advantages of the invention will be apparent from the following description and the appended claims.

DETAILED DESCRIPTION

The present invention discloses terpene additives adapted to clean or inhibit build up on drilling equipment, such as flowlines, injection lines, shakers, and other surfaces in a drilling system or production system. More particularly, the present invention relates to the use of terpene additives in water based well fluids. Terpene additives according to the present invention are generally head-to-tail condensation products of modified or unmodified isoprene molecules. The terpenes may be mono-, bi-, tri-, or tetracyclic compounds having varying degrees of unsaturation. Examples of suitable terpenes include, but are not necessarily limited to, d-limonene, terebene, dipentene, pinene, terpinene, myrcene, terpinolene, phellandrene, fenchene, and the like, as well as blends thereof.

As used in the specification, the term "effective amount" simply means an amount sufficient to decrease the accretion of heavy oil and other deposits by a measurable amount.

D-Limonene (or (R)-1-methyl-4-(1-methylethenyl) cyclohexene), listed above, is a biodegradable solvent occurring in nature as the main component of citrus peel oil. It should be noted, however, that the use of l-limonene is also within the scope of the present invention as a suitable terpene. The chemical structure of d-limonene is reproduced below.

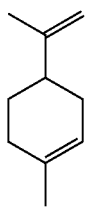

Eq. 1

In a first embodiment, a "preventative" well fluid was prepared by adding 0.25% by weight d-limonene (nominally 100% pure) into a water-based well fluid having a concentration of 4.0 kg/m$^3$ xanthan gum as a viscosifier. 200 mL of this mixture was mixed with 18% by volume of a sand sample contaminated with oil (bitumin oil). Three pre-weighed roller bearings were added to the sand/well-fluid mixture. The bearings/sand/well fluid was then dynamically aged by rolling the mixture for 6 hours at 10° C. The roller bearings were then removed and weighed again. The difference in weight between the initial and final readings was termed the grams of oil retention to the metal. It was discovered that, in this embodiment, 2.486 grams of oil were retained on the metal.

In a second embodiment, a "preventative" well fluid was prepared by adding 0.50% by weight d-limonene (nominally 100% pure) into a water-based well fluid having a concentration of 4.0 kg/m$^3$ xanthan gum as a viscosifier. 200 mL of this mixture was mixed with 18% by volume of a sand sample contaminated with bitumin oil. Three pre-weighed roller bearings were added to the sand/well-fluid mixture. The bearings/sand/well fluid mixture was then dynamically aged by rolling the mixture for 6 hours at 10° C. The roller bearings were then removed and weighed again. The difference in weight between the initial and final readings was termed the grams of oil retention to the metal. It was discovered that, in this embodiment, 0.876 grams of oil were retained on the metal.

In a third embodiment, a "preventative" well fluid was prepared by adding 0.75% by weight d-limonene (nominally 100% pure) into a water-based well fluid having a concentration of 4.0 kg/m$^3$ xanthan gum as a viscosifier. 200 mL of this mixture was mixed with 18% by volume of a sand sample contaminated with bitumin oil. Three pre-weighed roller bearings were added to the sand/well-fluid mixture. The bearings/sand/well fluid mixture was then dynamically aged by rolling the mixture for 6 hours at 10° C. The roller bearings were then removed and weighed again. The difference in weight between the initial and final readings was termed the grams of oil retention to the metal. It was discovered that, in this embodiment, 1.167 grams of oil were retained on the metal.

In a fourth embodiment, a "preventative" well fluid was prepared by adding 1.0% by weight d-limonene (nominally 100% pure) into a water-based well fluid having a concentration of 4.0 kg/m$^3$ xanthan gum as a viscosifier. 200 mL of this mixture was mixed with 18% by volume of a sand sample contaminated with bitumin oil. Three pre-weighed roller bearings were added to the sand/well-fluid mixture. The bearings/sand/well fluid mixture was then dynamically aged by rolling the mixture for 6 hours at 10° C. The roller bearings were then removed and weighed again. The difference in weight between the initial and final readings was termed the grams of oil retention to the metal. It was discovered that, in this embodiment, 0.691 grams of oil were retained on the metal.

As a comparison, the above process was performed absent the d-limonene. That is, 200 mL of water based well fluid was added to 18% by volume sand sample contaminated with oil. Three pre-weighed roller bearings were added, and the entire mixture was dynamically aged by rolling the mixture for 6 hours at 10° C. It was discovered that 3.292 grams of oil were retained on the metal.

As a second comparison, the above process was performed using potassium sulfate rather than d-limonene. In this comparison, 1.0% by weight potassium sulfate was added into a water-based well fluid having a concentration of 4.0 kg/m$^3$ xanthan gum as a viscosifier. 200 mL of this mixture was mixed with 18% by volume of a sand sample contaminated with oil. Three pre-weighed roller bearings were added to the sand/well-fluid mixture. The bearings/sand/well fluid mixture was then dynamically aged by rolling the mixture for 6 hours at 10° C. The dynamic aging consisted of rolling the mixture. The roller bearings were then removed and weighed again. The difference in weight between the initial and final readings was termed the grams of oil retention to the metal. It was discovered that 2.079 grams of oil were retained on the metal.

The results are tabulated below.

TABLE 1

EFFECT OF ADDITIVE ON OIL RETENTION OF METAL AT 10° C.

| AMOUNT/TYPE OF ADDITIVE | GRAMS OF OIL/SAND RETAINED TO THE METAL |
| --- | --- |
| 0.25% by weight d-limonene | 2.486 |
| 0.5% by weight d-limonene | 0.876 |
| 0.75% by weight d-limonene | 1.167 |
| 1.0% by weight d-limonene | 0.691 |
| No additive | 3.292 |
| 1.0% by weight potassium sulfate | 2.079 |

Table 1 illustrates that the addition of d-limonene to a water-based well fluid reduces the amount of oil retained by metal. In particular, adding 1.0% by weight d-limonene to the water-based well fluid reduces the amount of oil retained by a factor of approximately 5.

In a sixth embodiment, the effect of temperature on oil reduction was determined. In the sixth embodiment, a "preventative" well fluid was prepared by adding 0.25% by weight d-limonene (nominally 100% pure) into a water-based well fluid having a concentration of 4.0 kg/m$^3$ xanthan gum as a viscosifier. 200 mL of this mixture was mixed with 18% by volume of a sand sample contaminated with bitumin oil. Three pre-weighed roller bearings were added to the sand/well-fluid mixture. The bearings/sand/well fluid mixture was then dynamically aged by rolling the mixture for 6 hours at 25° C. The roller bearings were then removed and weighed again. The difference in weight between the initial and final readings was termed the grams of oil retention to the metal. It was discovered that, in this embodiment, 0.997 grams of oil were retained on the metal.

In a seventh embodiment, a "preventative" well fluid was prepared by adding 0.50% by weight d-limonene (nominally 100% pure) into a water-based well fluid having a concentration of 4.0 kg m$^3$ xanthan gum as a viscosifier. 200 mL of this mixture was mixed with 18% by volume of a sand sample contaminated with bitumin oil. Three pre-weighed roller bearings were added to the sand/well-fluid mixture. The bearings/sand/well fluid mixture was then dynamically aged by rolling the mixture for 6 hours at 10° C. The roller bearings were then removed and weighed again. The difference in weight between the initial and final readings was termed the grams of oil retention to the metal. It was discovered that, in this embodiment, 0.683 grams of oil were retained on the metal.

In an eighth embodiment, a "preventative" well fluid was prepared by adding 0.75% by weight d-limonene (nominally 100% pure) into a water-based well fluid having a concentration of 4.0 kg/m$^3$ xanthan gum as a viscosifier. 200 mL of this mixture was mixed with 18% by volume of a sand sample contaminated with bitumin oil. Three pre-weighed roller bearings were added to the sand/well-fluid mixture. The bearings/sand/well fluid mixture was then dynamically aged by rolling the mixture for 6 hours at 25° C. The roller bearings were then removed and weighed again. The difference in weight between the initial and final readings was termed the grams of oil retention to the metal. It was discovered that, in this embodiment, 2.275 grams of oil were retained on the metal.

In a ninth embodiment, a "preventative" well fluid was prepared by adding 1.0% by weight d-limonene (nominally 100% pure) into a water-based well fluid having a concentration of 4.0 kg/m$^3$ xanthan gum as a viscosifier. 200 mL of this mixture was mixed with 18% by volume of a sand sample contaminated with bitumin oil. Three pre-weighed roller bearings were added to the sand/well-fluid mixture. The bearings/sand/well fluid mixture was then dynamically aged by rolling the mixture for 6 hours at 25° C. The roller bearings were then removed and weighed again. The difference in weight between the initial and final readings was termed the grams of oil retention to the metal. It was discovered that, in this embodiment, 0.952 grams of oil were retained on the metal.

As a comparison, the above process was performed absent the d-limonene. That is, 200 mL of well fluid was added to 18% by volume sand sample contaminated with oil. Three pre-weighed roller bearings were added, and the entire mixture was dynamically aged by rolling the mixture for 6 hours at 25° C. It was discovered that 3.829 grams of oil were retained on the metal.

As a second comparison, the above process was performed using potassium sulfate rather than d-limonene. In this comparison, 1.0% by weight potassium sulfate was added into a water-based well fluid having a concentration of 4.0 kg/m$^3$ xanthan gum as a viscosifier. 200 mL of this mixture was mixed with 18% by volume of a sand sample contaminated with oil. Three pre-weighed roller bearings were added to sand/well-fluid mixture. The bearings/sand/ well fluid mixture was then dynamically aged by rolling the mixture for 6 hours at 25° C. The roller bearings were then removed and weighed again. The difference in weight between the initial and final readings was termed the grams of oil retention to the metal. It was discovered that 4.089 grams of oil were retained on the metal.

The results are tabulated below.

TABLE 2

EFFECT OF ADDITIVE ON OIL RETENTION OF METAL AT 25° C.

| AMOUNT/TYPE OF ADDITIVE | GRAMS OF OIL/SAND RETAINED TO THE METAL |
|---|---|
| 0.25% by weight d-limonene | 0.997 |
| 0.5% by weight d-limonene | 0.683 |
| 0.75% by weight d-limonene | 2.275 |
| 1.0% by weight d-limonene | 0.952 |
| No additive | 3.829 |
| 1.0% by weight potassium sulfate | 4.089 |

Table 2 illustrates that the addition of d-limonene to a water-based well fluid reduces the amount of oil retained by metal. In particular, adding 0.5% by weight d-limonene to the water-based well fluid reduces the amount of oil retained by a factor of approximately 5.

In addition, while the embodiments described above make reference to 100% d-limonene, no limitation on the purity of the d-limonene is intended. Also, while the above embodiment describes a particular order of addition for the chemical components, the order of addition is not intended to be limiting. Further, while reference is made to a particular terpene additive, other suitable terpenes may be mono-, bi-, tri-, or tetracyclic compounds having varying degrees of unsaturation. Examples of suitable terpenes include, but are not necessarily limited to, 1-limonene, terebene, dipentene, pinene, terpinene, myrcene, terpinolene, phellandrene, fenchene, and the like, as well as blends thereof Further, while reference is made to particular concentrations of terpene additive in the above examples, it is expressly within the scope of the invention that more or less terpene than that described above may be used, so long as the amount is effective (i e., reduces the amount of retained oil by a measurable amount). Preferably, the present invention includes approximately 0.25% to 15% by weight terpene in the water-based well fluid. More preferably, the present invention includes 0.5% to 1.5% by weight terpene in the water-based well fluid. Still more preferably, the present invention includes approximately 0.5% to 1.0% by weight terpene in the present invention.

The present invention, therefore, advantageously provides an environmentally benign, low cost well fluid additive which significantly reduces oil accretion on metal surfaces.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for cleaning and inhibiting deposits in and on well equipment used in conjunction with a water-based well fluid, comprising:

mixing an effective amount of an additive in the water-based well fluid, wherein the additive forms about 0.25% to 15% by weight of the water-based well fluid, the additive comprising a terpene; and moving the water-based well fluid through or over the well equipment.

2. The method of claim 1, wherein the terpene comprises d-limonene.

3. The method claim 1, wherein the terpene comprises at least one compound selected from the group consisting of terbene, dipentene, pinene, terpinene, myrcene, terpinolene, phellandrene, and fenchene.

4. The method of claim 1, wherein the terpene forms about 0.5% to 1.5% by weight of the water-based well fluid.

5. The method of claim 1, wherein the terpene forms about 0.5% to 1.0% by weight of the water-based well fluid.

6. A method for cleaning and inhibiting deposits in and on well equipment used in conjunction with a water-based well fluid, comprising:

mixing an effective amount of d-limonene in the water-based well fluid, wherein the d-limonene forms about 0.25% to 15% by weight of the water-based well fluid; and moving the water-based well fluid through or over the well equipment.

7. The method of claim 6, wherein the d-limonene forms about 0.5% to 1.5% by weight of the water-based well fluid.

8. The method of claim 7, wherein the d-limonene forms about 0.5% to 1.0% by weight of the water-based well fluid.

9. A water-based well fluid additive comprising:

about 0.25% to about 15% by weight terpene; and 0.1% to 99.75% water based-well fluid.

10. The additive of claim 9, wherein the terpene comprises d-limonene.

11. The additive of claim 9, wherein the terpene comprises at least one compound selected from the group consisting of terebene, dipentene, pinene, terpinene, myrcene, terpinolene, phellandrene, and fenchene.

\* \* \* \* \*